Sept. 2, 1969     F. D. HOUCK     3,464,503

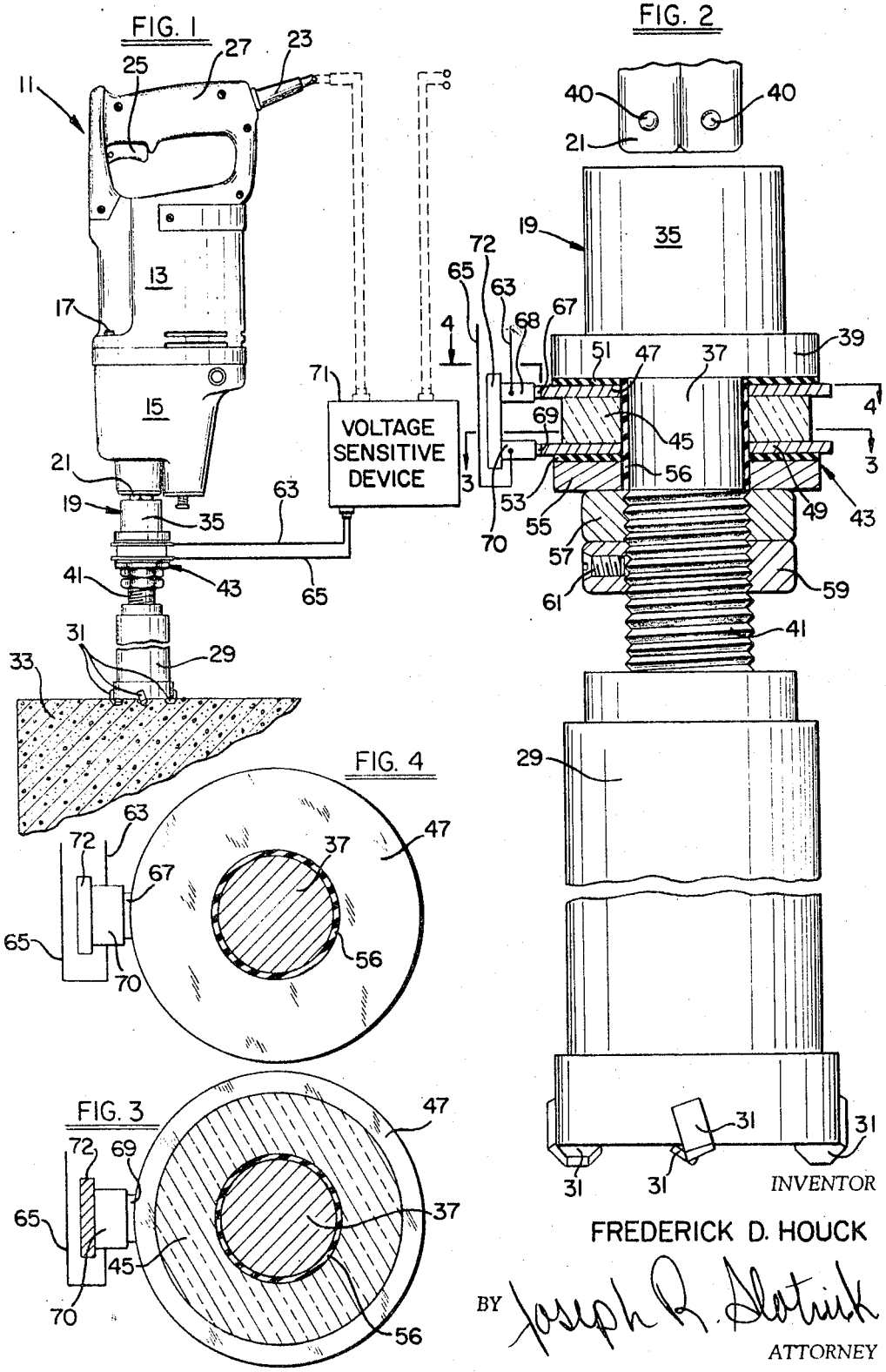

MEASURING DEVICE FOR IMPACT TOOL

Filed June 25, 1968     2 Sheets-Sheet 2

INVENTOR

FREDERICK D. HOUCK

BY *Joseph R. Slotnik*

ATTORNEY

United States Patent Office 3,464,503
Patented Sept. 2, 1969

3,464,503
MEASURING DEVICE FOR IMPACT TOOL
Frederick D. Houck, Columbus, Ohio, assignor to The Black and Decker Manufacturing Company, Towson, Md., a corporation of Maryland
Filed June 25, 1968, Ser. No. 739,718
Int. Cl. E21b 9/35; E21c 5/16; B23q 5/00
U.S. Cl. 173—20
15 Claims

ABSTRACT OF THE DISCLOSURE

The device disclosed herein is a powered, portable, impact tool with an operating parameter measuring system integrated therewith. The system includes a piezoelectric crystal device carried by the tool between an impact mechanism and a tool bit and which is connected to a voltage sensitive device. The piezoelectric crystal device develops voltage pulses in response to the impact blows transmitted longitudinally to the tool bit, and feeds them to the voltage sensitive device which may translate them into readable data or use them to control the characteristics of the input to the tool.

SUMMARY OF THE INVENTION

The invention relates to an impact tool, parameter measuring system and the manner in which it is integrated with the tool. The system includes a piezoelectric crystal device fixed directly on the tool in a manner so as to be accurately responsive to the amplitude and frequency of the impact force blows transmitted longitudinally to the tool bit while not being part of the force transmitting medium itself. The crystal device develops voltage pulses at the same frequency as the transmitted impact blows and the amplitude of these pulses is a function of the amplitude of the transmitted force. The voltage pulses are fed to a voltage sensitive device which may be simply an oscilloscope to provide a visual reading of the tool operating parameters (force amplitude and frequency), or it may be a sophisticated feed-back control interposed between a power source and the tool adapted to vary the power input to the tool to maintain predetermined operating parameters in the tool. The parameter measuring system is characterized by the fact that it provides an accurate measurement of tool parameters, does not interfere with tool operation, requires little effort to adapt the tool for use therewith, adds a minimum to the overall size, weight and complexity of the tool, is constructed to withstand the forces developed in the tool, is easily insulated from the tool and may be used with a variety of different types of impact tools, rotary or otherwise.

Main objects of the present invention, therefore, are to provide a system for measuring operating parameters in an impact tool, which system may be integrated with an impact tool without affecting its performance and provides an accurate measurement of the tool operating parameters which measurement may be monitored and used to test and/or compare various tools, or which may be used to directly control tool operation through the input to the tool.

Additional important objects of the present invention are to provide a system of the above character which requires little tool modification to adapt its use and which contributes minimally to the overall tool size and complexity.

Further important objects are to provide a system of the above character which is versatile in that it is readily adapted for use with a variety of tools, which is relatively inexpensive to manufacture, rugged and safe in construction and reliable and consistent in result.

Other objects and advantages of the present invention will become more apparent from a consideration of the detailed description to follow taken in conjunction with the drawings annexed hereto.

BRIEF DESCRIPTION OF THE DRAWINGS

FIG. 1 is an elevational view illustrating a typical installation of a system embodying a preferred form of the present invention and showing, diagrammatically, how the system may be used to monitor tool operating parameters or provide feed-back control for a tool;

FIG. 2 is an enlarged view, partly in section, illustrating the mechanical interconnection of the inventive system with the tool components;

FIG. 3 is a sectional view of FIG. 2 taken along the line 3—3 thereof;

FIG. 4 is a sectional view of FIG. 2 taken along the line 4—4 thereof; and

BROAD STATEMENT OF THE INVENTION

Figure 5:
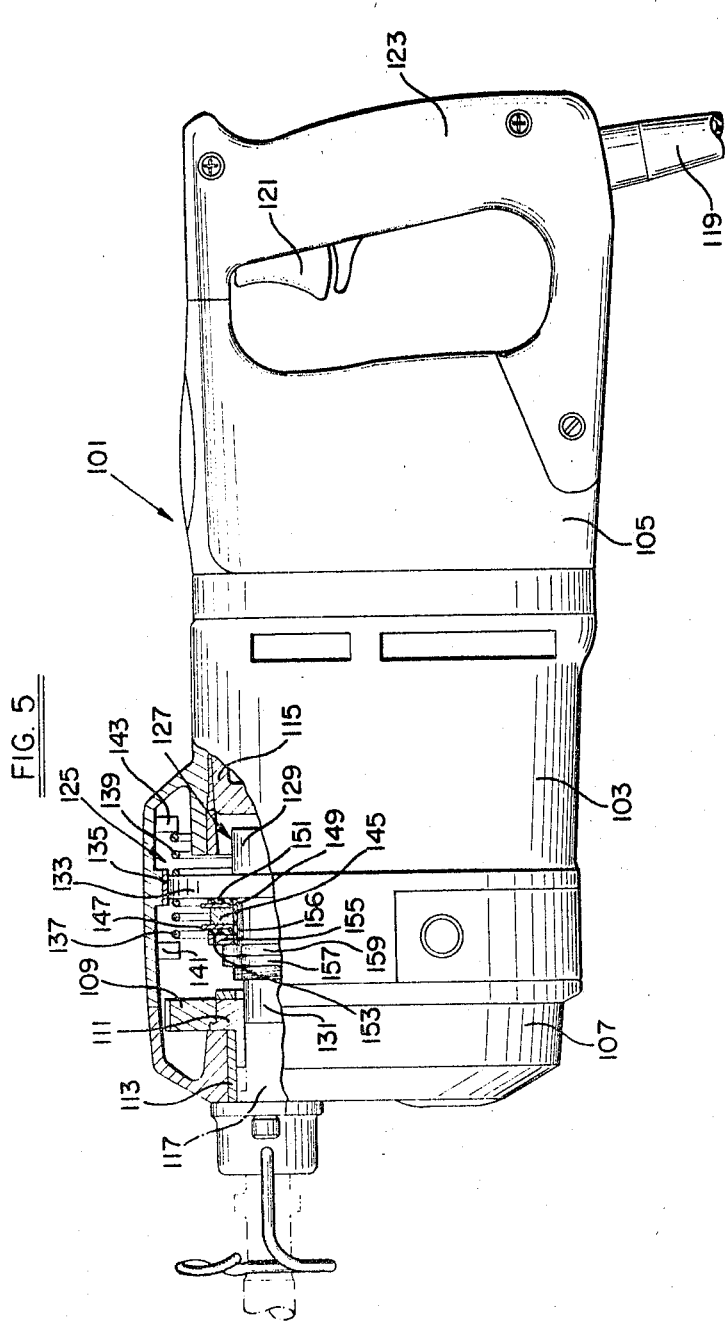
FIG. 5 is a side elevational view, partly broken away and partly in section, illustrating an alternate method of embodying the present invention in an impact tool.

Broadly described, the present invention includes a force measuring system for use with impact tools and the like of the type having a tool bit, impact means for imparting periodic force blows to said tool bit along a longitudinal axis, and rigid transmitting means between said impact means and said tool bit and forming a medium for transmitting said force from said impact means to said tool bit; said system comprising piezoelectric crystal means rigidly mounted on said transmitting means and independent of said medium, means normally holding said piezoelectric crystal means under compression in a direction along said longitudinal axis, said piezoelectric crystal means being adapted to generate voltage pulses at the frequency of said transmitted impact blows, the amplitude of said generated voltage pulses being a function of the amplitude of said transmitted impact force blows, voltage sensitive means, and means electrically interconnecting said piezoelectric crystal means and said voltage sensitive means.

In another aspect, the present invention includes a tool bit assembly for use with an impact tool, said assembly comprising an elongated, rigid member having one end adapted for operative connection to an impacting member, a tool bit operatively engageable with said elongated member adjacent the other end thereof, piezoelectric crystal means loosely sleeved over said elongated member, means rigid with said elongated member holding said crystal means under compression in a direction longitudinally of said member, and electrode means associated with said crystal means.

DETAILED DESCRIPTION

Referring now more specifically to the drawings, a portable, electric, rotary hammer, which is illustrative of the type of tool with which the system of the present invention finds use, is illustrated generally at 11 in FIG. 1 and is seen to include a motor housing 13 having an end housing 15 secured thereto by screws 17. An electric motor (not shown) is disposed within the motor housing 13 and is adapted to rotate a socketed spindle (not shown) which is rotatably supported within the end housing 15. A rigid, transmitting assembly 10 is detachably interconnected with a shank 21 (FIG. 2) which is slidably but non-rotatably received in the socketed spindle (not shown) so as to rotate therewith while being free to reciprocate longitudinally relative thereto. An impact mechanism (not shown) is disposed within the motor and end housings 13, 15, being driven by the motor (not shown), and is adapted, when energized, to strike the inner end of the shank 21 and impart a longitudinal percussive blow to the transmitting assembly 19.

Power for the electric motor (not shown) is derived from an electrical source connected to the motor by a line cord 23 and a suitable on-off trigger switch 25 is carried by an end handle 27 rigid with the motor housing 13 and provides a convenient on-off control for the tool 11. The power train (motor, transmission, etc.) for the tool 11 does not form any part of the present invention and is not illustrated nor described further here; however, for a more detailed description thereof, reference may be made to the copending application of Daniel A. Miller, Ser. No. 672,274 and filed Oct. 2, 1967.

Typically, the hammer 11, when energized, imparts longitudinal percussion or impact blows, with or without rotation, to the transmitting assembly 19. A tool bit, in this case a core bit 29 provided with teeth 31, is rigidly interconnected with the tool bit shank 21 through the transmitting assembly 19 and is adapted to penetrate a workpiece such as, for example, concrete block 33.

It is desirable to measure the operating parameters (impact blow frequency and/or amplitude of impact force) of tools of this type in order to evaluate these tools, compare or test them, or to maintain predetermined operating parameters during use. The system of the present invention makes it possible to obtain an accurate reading of the actual force transmitted from the tool impact mechanism to the tool bit 29 for each percussive blow as well as the frequency of impact. This is achieved by piezoelectric crystal means which is rigidly carried by the transmitting assembly 19 but is not a part of the force transmitting medium. During operation of the tool, the crystal means generates voltage pulses at the frequency of the transmitted blows, the amplitude of which is a function of the amplitude of transmitted force. The voltage pulses are fed to voltage sensitive means (e.g. an oscilloscope, feed-back control to the tool input) which monitors or makes other use of the generated voltage pulses.

Thus, as shown best in FIG. 2, the transmitting assembly 19 includes a rigid, relatively massive body including an input portion 35 socketed to non-rotatably receive the shank 21, and a reduced diameter post 37 rigid with the portion 35 and separated therefrom by a radial flange 39. Detent balls 40 on the shank 21 detachably secure the portion 35 thereto. The post 37 has its outer portion threaded, as shown at 41, to thread into the core bit 29 for attachment thereto.

Piezoelectric crystal means 43 is carried by the transmitting assembly 19 and is seen to include one or a plurality of wafer like, piezoelectric crystals 45 adapted to loosely fit over the post 37. The crystal 45, here illustrated, is sandwiched between a pair of brass electrodes 47, 49 which also are loosely disposed on the post 37. An insulation washer 51 is interposed between the electrode 47 and the flange 39 while another insulation washer 53 is interposed between the electrode 49 and a flat washer 55, and the electrodes 47, 49 and crystal 45 are spaced from the post 37 by insulating or packing material 56 so as to insulate the post 37 therefrom and prevent arcing thereacross. A first lock nut 57 is threaded on the post portion 41 and bears against the flat washer 55 to hold the crystal 45 in place and a second lock nut 59 is threaded up against the first lock nut 57 to prevent it from becoming loose during use of the tool. If desired, a set screw 61 may be provided on the lock nut 59 to prevent it from backing off the threads 41 on the post 37.

It is known that a piezoelectric crystal device of this type will generate a voltage output, the amplitude of which is a function of the amplitude of the force applied thereto and the characteristics of the particular crystal device employed. It is also known that in the case of an applied pulsating force, the crystal alternately expands and contracts and is subjected to alternate tension and compression stresses so that it is necessary to preload this piezoelectric crystal in compression in the direction of the pulsating force, to insure that it remains in compression during alternate expansion and contraction and prevent it from shattering since these crystals are extremely weak in tension. To this end, the crystal 45 is loaded in compression by drawing the lock nut 57 sufficiently tight and compressing the crystal 45 between the nut 57 and the flange 39. Then when a pulsating force is applied, the crystal alternately expands and contracts, but remains in compression.

Electrical leads 63, 65 are connected to the electrodes 47, 49 by carbon brushes 67, 69 carried by brush holders 68, 70, respectively. The brush holders 68, 70 are fixedly supported by a bracket 72 while the electrical leads 63, 65 are connected to a voltage sensitive device 71 such as, for example, an oscilloscope. Thus, in this arrangement, the magnitude and frequency of the voltage generated at the crystal 45 may be read at the oscilloscope 71.

It will be appreciated that the brush connection between the leads 63, 65 and the electrodes 47, 49 is for the purpose of allowing the electrodes 47, 49 to rotate should the tool bit 29 be rotated. It will be understood, however, that other forms of interconnection between the leads and electrodes may be desirable, including a direct, rigid connection should the tool bit 29 not rotate.

During operation of the tool 11, impact force is transmitted in the form of velocity and stress waves, from the shank 21 through the transmitting assembly 19 and to the tool bit 29. The piezoelectric crystal device 43 is rigidly mounted on the transmitting assembly 19, even though not a part of the force transmitting medium. Thus, the device 43 is subjected to these periodic waves but is not subjected to such forces as it would be, for example, were it a part of the force transmitting medium.

As the impact force is transmitted to the bit 29, the piezoelectric crystal 45 alternately expands and contracts at the same frequency as the transmitted impact blows, and generates voltage pulses at this frequency, which pulses have an amplitude which is a function of the transmitted force blow amplitude. An odd number of crystals 45 is employed, here shown to be one, so that the outermost crystal faces are at opposite potential. The electrodes 47, 49, which are in contact with these outermost crystal faces, are also at this potential and impress this pulsating voltage upon the voltage sensitive device 71. Then, since the force applied to the crystals is a function of the generated voltage and the characteristics of the crystal (a constant), the applied impact force is easily determined.

In an alternative arrangement, the generated voltage signal from the crystal 45 may be fed into a feed-back control circuit for the tool input. In this case, the feed-back circuit, also represented by the box 71, has the power source for the tool 11 connected thereto, as shown by the broken lines in FIG. 1. Here, the feed-back control circuit 71 monitors and, if necessary, varies the frequency and/or amplitude of the input voltage to the tool 11, to maintain a predetermined frequency and amplitude of voltage pulses generated at the piezoelectric device 43 which therefore maintains desired operating parameters of the tool 11. The details of the feed-back control circuit are omitted here but will be understood by one skilled in the art.

As described above, the voltage generated at the piezoelectric crystal 45 is a function of the force applied thereon and the characteristics of the crystals. This may be represented as follows:

$$\text{Voltage} = \frac{\text{Force} \times \text{crystal thickness} \times G}{\text{crystal surface area}}$$

For one piezoelectric crystal material found to be very satisfactory, G is equal to about 3.3 so that the applied force is computed as follows:

$$\text{Force} = \frac{\text{Voltage} \times \text{surface Area}}{3.3 \times \text{Thickness}}$$

Of course, it will be understood that the value of G can vary according to the type of piezoelectric crystal material employed and according to its manufacture; but, in any event, is easily obtained from the manufacturer.

The value of this invention is easily recognized when considering that it provides a very accurate but easy way of comparing or monitoring impact tool operating parameters. Thus, with the crystal device 43 intact on the transmitting assembly 19, a tool bit 29 is fastened thereto and the assembly fastened to the shank 21. No modification of the tool 11 is required and the system is just as easily removed from the tool 11 when desired.

An alternate method of embodying the present invention in an impact tool is illustrated in FIG. 5. The tool, illustrated generally at 101, is seen to include detachably secured motor, handle and end housings 103, 105, 107. An electric motor (not shown) is disposed within the motor housing 103 and is adapted to rotate a gear 109 which in turn rotates a tool bit socket 111 rotatably supported by a bearing 113 in the end housing 107. In addition, the motor (not shown) is interconnected with and adapted to reciprocate a ram 115 which, in turn, delivers impact blows to the inner end of a tool bit shank 117 socketed within the tool bit socket 111. Power for the electric motor (not shown) is derived from a source connected thereto by a line cord 119 and is controlled by a trigger switch 121 disposed on a handle 123 rigid with the handle housing 105.

As was the case in the embodiment of FIGS. 1–4, the force of the impact blows are transmitted from the impact source, here the ram 105, to the tool bit shank 117 by means of a transmitting assembly, here illustrated generally at 125. This transmitting assembly 125 includes an integral massive section 127 including an input portion 129 adapted to be struck by the ram 115, and a reduced diameter, output portion 131 adapted to strike the tool bit shank 117. A relatively large radial flange 133 is formed on the input portion 129 and is supported for limited axial movement by a sleeve bearing 135 fixed to the motor housing 103. A pair of compression springs 137, 139 engage opposite sides of the flange 133 and abutment flanges 141, 143 in the motor housing 103 to resiliently position the transmitting assembly while allowing limited free axial movement thereof. If desired, the transmitting assembly 125 can be keyed to the motor housing 103 so as not to rotate relative thereto.

As was the case in the embodiment of FIGS. 1–4, piezoelectric crystal means is rigidly carried by the transmitting assembly 125 but is not a part of the force transmitting medium. Thus, a crystal 145 is loosely sleeved over the input portion 129 and is flanked by a pair of electrodes 147, 149 also loosely fitted on the portion 129. One insulating washer 151 is trapped between the electrode 149 and the flange 133 while another insulating washer 153 is positioned between the electrode 147 and a flat washer 155. Thus, like the embodiment of FIGS. 1–4, the washers 151, 153 insulate the electrodes 147, 149 from the flange 133 and washer 155, and an air gap between the input portion 129 and the crystal 145 and electrodes 147, 149 insulates the input portion 129. An insulating packing material 156 is provided in this air space. These parts are held in position on the input portion 129 and the crystal 145 loaded in compression by a pair of lock nuts 157, 159 threaded on the portion 129 and bearing against the flat washer 155.

In use, the ram 115 impacts against the rigid transmitting assembly 125 and the force of the impact blows is transmitted from the input portion 129 to the output portion 131 and thence to the tool bit shank 117. The piezoelectric crystal 145 alternately expands and contracts, in response to the pulsating force delivered through the transmitting assembly, and generates a voltage having an amplitude which, as described above, is a function of the force amplitude and the crystal characteristics. The electrodes 147, 149 are adapted to be connected by electrical leads (not shown) to a voltage sensitive device such as an oscilloscope or a feed back for the tool 101, also set out above in the description of FIGS. 1–4. It will be appreciated that the connection between the electrodes 147, 149 and the leads (not shown) can be a solder-type connection (rather than a brush-type shown in FIGS. 2–4) since the transmitting assembly 125 is not intended to rotate.

I claim:

1. A force measuring system for use with impact tools and the like of the type having a tool bit, impact means for imparting periodic force blows to said tool bit along a longitudinal axis, and rigid transmitting means between said impact means and said tool bit and forming a medium for transmitting said force from said impact means to said tool bit; said system comprising piezoelectric crystal means rigidly mounted on said transmitting means and independent of said medium, means normally holding said piezoelectric crystal means under compression in a direction along said longitudinal axis, said piezoelectric crystal means being adapted to generate voltage pulses at the frequency of said transmitted impact blows, the amplitude of said generated voltage pulses being a function of the amplitude of said transmitted impact force blows, voltage sensitive means, and means electrically interconnecting said piezoelectric crystal means and said voltage sensitive means.

2. A system as defined in claim 1 wherein said voltage sensitive means comprises an oscilloscope.

3. A system as defined in claim 1 wherein said transmitting means includes an elongated, relatively massive body, said piezoelectric crystal means being sleeved over said body and rigidly fixed relative thereto.

4. A system as defined in claim 3 wherein said body has a radial flange rigid therewith, said crystal means including at least one crystal located adjacent said flange, and means adjustably carried by said body and adapted to operatively compress said crystal axially against said flange.

5. A system as defined in claim 4 which includes a pair of electrodes flanking said at least one crystal, said electrodes being electrically connected to said voltage sensitive means.

6. A system as defined in claim 5 which further includes insulating means between said electrodes and said flange and said adjustable means, and means insulating said electrodes and said at least one crystal from said body.

7. A system as defined in claim 5 which includes an insulating washer between each said electrode and said flange and adjustable means, respectively.

8. A system as defined in claim 5 wherein said at least one crystal and said electrodes are spaced from said body by an insulating packing material.

9. A tool bit assembly for use with an impact tool, said assembly comprising an elongated, rigid member having one end adapted for operative connection to an impacting member, a tool bit operatively engageable with said elongated member adjacent the other end thereof, piezoelectric crystal means loosely sleeved over said elongated member, means rigid with said elongated member holding said crystal means under compression in a direction longitudinally of said member, and electrode means associated with said crystal means.

10. A tool bit assembly as defined in claim 9 wherein said tool bit is detachably connected to said elongated member.

11. A tool bit assembly as defined in claim 9 wherein said piezoelectric crystal means comprises at least one crystal, and said electrode means including a pair of electrodes flanking said at least one crystal.

12. A tool bit assembly as defined in claim 11 which includes a flange rigid with said body, and means adjustably carried by said body for operatively compressing said at least one crystal and said electrodes between said adjustable means and said flange.

13. A tool bit assembly as defined in claim 12 which includes means insulating said at least one crystal and said electrodes from said body and said electrodes from said adjustable means and said flange.

14. A tool bit assembly as defined in claim 12 which includes an insulating washer between each said electrode and said flange and adjustable means, respectively.

15. A tool bit assembly as defined in claim 12 wherein said at least one crystal and said electrodes are spaced from said body by an insulating packing material.

References Cited
UNITED STATES PATENTS

| | | | |
|---|---|---|---|
| 1,921,624 | 8/1933 | Lewis | 73—11 |
| 2,691,159 | 10/1954 | Heibel | 73—11 X |
| 3,213,666 | 10/1965 | Rudnick | 73—11 |

ERNEST R. PURSER, Primary Examiner

U.S. Cl. X.R.

73—11; 173—2, 131